Patented Aug. 17, 1926.

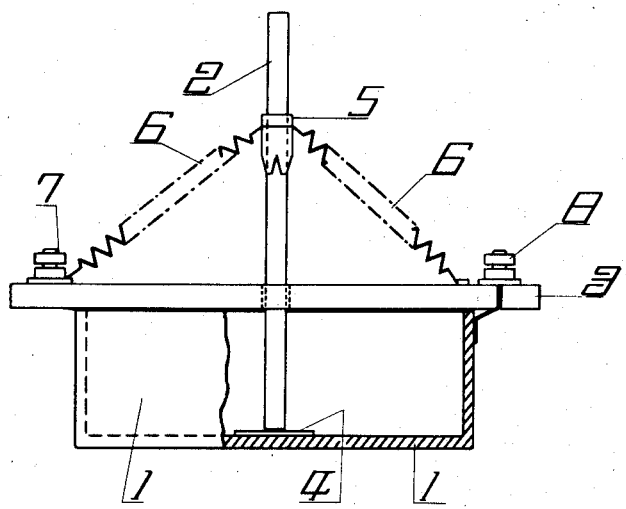
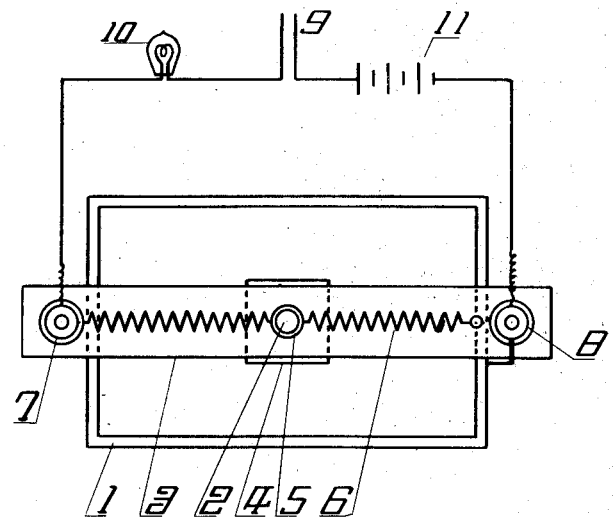

1,596,560

UNITED STATES PATENT OFFICE.

ZENSUKE TAKAHASHI, OF ASHIKAGA, JAPAN.

ALUMINUM RECTIFIER.

Application filed September 7, 1922, Serial No. 586,582, and in Japan December 22, 1921.

The present invention relates to improvements in the aluminum rectifier used for converting the alternating current into the direct current and has for its object to obtain the exact, long and efficient rectifying action compared with the known aluminum rectifier.

The aluminum rectifier according to this invention is so characterized that a lead tank is formed moderately flat to serve as one electrode as well as an electrolyte container, and an aluminum rod, which is vertically supported and serves as the other electrode, is arranged to always press the bottom of the lead tank under the weight of the rod itself and the action of springs through a thin plate of insulating material which can conduct electricity when wet with the electrolyte.

In the accompanying drawing given by way of example:

Figure 1 shows an elevational view partly in section of an aluminum rectifier according to the invention, and Figure 2 shows a plan view of the said aluminum rectifier in the electric circuit.

In the drawing, a lead tank 1 is formed moderately flat to serve as one electrode as well as an electrolyte container, and an aluminum rod 2 is vertically supported by a wooden bar 3, which bridges over the lead tank, and serves as the other electrode. The lowest end of the rod 2 presses the bottom of the tank 1 through a thin plate 4 of insulating material, such as thick paper, fibre tissue, etc., which can conduct electricity when it gets wet with the electrolyte. On the upper part of the said rod is so arranged a metal sleeve 5 as the rod always contacts with the plate 4 under the weight of the rod itself and the action of springs 6 attached to the sleeve. One of the springs 6 is secured to one terminal 7 while the other is secured to the wooden support 3 as shown in the drawing. The other terminal 8 is in the electrical connection with the lead tank 1. The whole members are put in a wooden case (not shown in the drawing) so as to be portable.

The working of the present aluminum rectifier, which is applied for the battery charging, for example, is as follows:

The terminals 7 and 8 are connected with the alternating current supply source 9 through a lamp resistance 10, for example, and a battery 11, respectively, the terminal 8 in the electrical connection with the lead tank 1 being connected with the negative electrode of the said battery, as shown in Figure 2. Then the current exactly passes only in one direction through the electrolyte from the lead tank to the aluminum rod, and charges the battery. If the aluminum electrode were dissipated at the lowest end, it would be forced to come down and touch the thin plate by means of the weight of the rod itself and the action of the springs, thus the distance between the electrodes remaining the same. Moreover the area of the lead electrode contact with the electrolyte being comparatively large, the rectifying action takes place more efficiently and continues relatively long notwithstanding that the quantity of the electrolyte gradually decreases owing to the evaporation.

It is of course to be understood that the aluminum rectifier described above may be used for various purposes besides the battery charging, and also that it may be modified in various manners without departing from the scope of this invention.

I claim:—

An aluminum rectifier comprising a lead tank adapted to serve as one electrode as well as an electrolyte container, an aluminum rod adapted to serve as the other electrode, a thin plate of insulating material on the bottom of said tank interposed between the end of said rod and the bottom of said tank, and springs interposed between the tank and said rod adapted to act as electric conductors and to press said rod against said plate, means bridged over the tank for supporting said rod and springs and insulating the same from the tank, said thin plate adapted to conduct electricity when wet with the electrolyte.

In testimony whereof I affix my signature.

ZENSUKE TAKAHASHI.